US012106351B1

(12) United States Patent
Verma et al.

(10) Patent No.: US 12,106,351 B1
(45) Date of Patent: *Oct. 1, 2024

(54) SYSTEM AND METHOD FOR AUTOMATIC PRODUCT MATCHING

(71) Applicant: Staples, Inc., Framingham, MA (US)

(72) Inventors: Nitin Verma, Natick, MA (US); Randall L. Cogill, Dedham, MA (US); Michael Bhaskaran, Sherborn, MA (US)

(73) Assignee: Staples, Inc., Framingham, MA (US)

( * ) Notice: Subject to any disclaimer, the term of this patent is extended or adjusted under 35 U.S.C. 154(b) by 193 days.

This patent is subject to a terminal disclaimer.

(21) Appl. No.: 17/807,861

(22) Filed: Jun. 20, 2022

Related U.S. Application Data

(63) Continuation of application No. 16/288,105, filed on Feb. 28, 2019, now Pat. No. 11,367,116.

(60) Provisional application No. 62/778,195, filed on Dec. 11, 2018.

(51) Int. Cl.
| | | |
|---|---|---|
| *G06Q 30/00* | (2023.01) | |
| *G06F 18/2431* | (2023.01) | |
| *G06N 20/00* | (2019.01) | |
| *G06Q 30/0601* | (2023.01) | |

(52) U.S. Cl.
CPC ..... *G06Q 30/0629* (2013.01); *G06F 18/2431* (2023.01); *G06N 20/00* (2019.01)

(58) Field of Classification Search
CPC . G06Q 30/0629; G06N 20/00; G06F 18/2431
See application file for complete search history.

(56) References Cited

U.S. PATENT DOCUMENTS

| | | |
|---|---|---|
| 6,266,649 B1 | 7/2001 | Linden et al. |
| 6,728,706 B2 | 4/2004 | Aggarwal et al. |
| 6,912,505 B2 | 6/2005 | Linden et al. |
| 7,117,163 B1 | 10/2006 | Iyer et al. |

(Continued)

OTHER PUBLICATIONS

Aaronson, Jack, Top 3 Ways to Use Product Attributes—ClickZ, Date of download Jan. 29, 2019, 2 pgs, Mediaagility.com, Online Article: https://www.clickz.com/top-3-ways-to-use-product-attributes/52756/.

(Continued)

*Primary Examiner* — Robert M Pond
(74) *Attorney, Agent, or Firm* — VLP Law Group, LLP; Michel Bohn

(57) ABSTRACT

The technology includes an example method for determining matching items. In some implementations, the method may determine a first set and second set of attributes and attribute types associated with a first and second item, respectively, based on description data associated with the items. The method may determine an attribute-type indicator for a pairing of a first attribute of the first set with a second attribute of the second set based on attribute types of the attributes, compute an attribute value for the pairing based (Continued)

on a similarity between the first and second attribute, and compute a match score for a combination of the first and second items based on the attribute value and attribute-type indicator. The method may also, in response to receiving a data query identifying the first item, provide a graphical user interface including a graphical element representing the second item based on the match score.

20 Claims, 6 Drawing Sheets

(56) References Cited

U.S. PATENT DOCUMENTS

| | | | |
|---|---|---|---|
| 7,720,720 | B1 | 5/2010 | Sharma et al. |
| 7,734,729 | B2 | 6/2010 | Du et al. |
| 7,809,615 | B2 | 10/2010 | Hui et al. |
| 7,882,427 | B2 | 2/2011 | Raja et al. |
| 8,468,064 | B1 | 6/2013 | Trandal et al. |
| 8,781,916 | B1 | 7/2014 | Buryak |
| 10,664,534 | B2 * | 5/2020 | Surya et al. ......... G06F 16/9535 |
| 11,037,071 | B1 | 6/2021 | Tekiela et al. |
| 11,367,116 | B1 * | 6/2022 | Verma ................. G06Q 30/0629 |
| 2010/0306080 | A1 | 12/2010 | Trandal et al. |
| 2011/0145732 | A1 | 6/2011 | Brindley |
| 2014/0136549 | A1 | 5/2014 | Surya et al. |
| 2014/0279249 | A1 | 9/2014 | Westphal |
| 2015/0379429 | A1 | 12/2015 | Lee et al. |
| 2016/0103923 | A1 | 4/2016 | Thomas et al. |
| 2018/0203836 | A1 | 7/2018 | Singh et al. |
| 2018/0315059 | A1 | 11/2018 | Venkatesh et al. |
| 2020/0097812 | A1 | 3/2020 | Csar et al. |

OTHER PUBLICATIONS

Geitgey, Adam, Content-Based Recommendations: Recommending Based on Product Attributes. Lynda.com Tutorial, Apr. 10, 2017, 5 pgs, https://www.lynda.com/Data-Science-tutorials/Content-based-recommendations-Recommending-based-product-attributes/563030/600814-4.html.

Ghani, Rayid et al., Text Mining for Product Attribute Extraction, ACM SIGKDD Explorations Newsletter, Jun. 2006, vol. 8, Issue 1, pp. 41-48.

Google Patent Search, https://patents.google.com/?q=product&q=recommendations&q=%22product+attr- ibutes%22, visited Oct. 26, 2017.

Ignite Sales, Internet Archive Wayback Machine/www.ignitesales.com, Jul. 16, 2018, 12pgs.

Ignite Sales Sees Strong Momentum as Retail Banks Face an Increasingly Competitive Environment, Internet Wire Feb. 6, 2013; Dialog #317715847, 3pgs.

Schafer, J. Ben et al., E-commerce Recommendation Applications, Data Mining and Knowledge Discovery, Jan.-Apr. 2001, vol. 5, Issue 1-2, pp. 115-153.

Sharma, Shivani, Personalize Your Customers Journey with Product Recommendations Powered by Google Cloud, Website, Date Downloaded, Jan. 29, 2019, 7 pages, https://www.mediaagility.com/get-started-product-recommendation- - ecommerce-google-cloud/.

* cited by examiner

SYSTEM AND METHOD FOR AUTOMATIC PRODUCT MATCHING

BACKGROUND

The present specification generally relates to automatically matching a group of items together based on similarity and using machine learning algorithms.

Individuals may research many items of varying types from one or more sources, but there is currently no way for the individual to know evaluate whether similar items are available to items researched without painstakingly searching for items line-by-line in a database to evaluate the specifications of items researched. This is time consuming and impractical, particularly for large sets of items.

In the past, determination of related items has been performed by evaluating the actions, such as purchases, browsing, shopping cart contents, wish list contents, etc., of users. However, these methods generally determine complementary items, rather than replacement items, are computationally inefficient, and require data about user interactions (e.g., purchases) of the items. For instance, past methods may be computationally inefficient by requiring computation of large data sets, long clickstreams, or significant user interaction data. Further, particularly for new or low volume items, sufficient user interaction may not be available or may be skewed toward incorrect or biased results.

Accordingly, there is a need for more efficient and improved technology for determining and cross-referencing items.

SUMMARY

A system can be configured to perform particular operations or actions by virtue of having software, firmware, hardware, or a combination of them installed on the system that causes the system to perform the actions. One general aspect includes a method including: determining, by a processor, a first set of attributes associated with a first item based on description data associated with the first item, each of the first set of attributes being associated with an attribute type of a set of attribute types; determining, by the processor, a second set of attributes associated with a second item based on description data associated with the second item, each of the second set of attributes being associated with an attribute type of the set of attribute types; determining, by the processor, a first attribute-type indicator for a pairing of a first attribute of the first set of attributes and a second attribute of the second set of attributes based on whether a first attribute type of the first attribute matches with a second attribute type of a second attribute of the second set of attributes; computing, by the processor, a first attribute value for the pairing of the first attribute and the second attribute based on a similarity between the first attribute and the second attribute; computing, by the processor, a match score for a combination of the first item and the second item based on the first attribute value and the first attribute-type indicator; and in response to receiving a data query identifying the first item, providing, by the processor, a graphical user interface including a graphical element representing the second item based on the match score.

Implementations may include one or more of the following features. The computer-implemented method where computing the match score includes training a machine learning model using the first attribute-type indicator and the first attribute value as independent features, and using the machine learning model to determine the match score, the match score indicating a strength of the similarity between the first item and the second item. The computer-implemented method where the machine learning model includes a multi-class classifier. The computer-implemented method where the machine learning model includes a random-forest classifier. The computer-implemented method where using the machine learning model to determine the match score includes computing the match score using probabilities of the combination of the first item and the second item being in each match-class of the multi-class classifier. The computer-implemented method where computing the match score for the combination of the first item and the second item is further based on a second attribute value and a second attribute-type indicator of the combination of the first item and the second item, the second attribute-type indicator representing whether a third attribute type of a third attribute matches a fourth attribute type of a fourth attribute, the first set of attributes including the third attribute and the second set of attributes including the fourth attribute, the second attribute value representing a second similarity between the third attribute and the fourth attribute. The computer-implemented method where computing the match score for the combination of the first item and the second item includes applying an attribute-type weight to the first attribute value. The computer-implemented method where the attribute-type weight is specific to an attribute type within a particular category of items and trained using logistic regression. The computer-implemented method where determining the first attribute-type indicator includes determining a common set of attribute types for the combination of the first item and the second item, the common set of attribute types including the attribute types that are common to both the first set of attributes and the second set of attributes. The computer-implemented method further including determining a match-class descriptor of the combination of the first item and the second item based on a threshold level of the match score, the match-class descriptor indicating a level of the similarity of the first item with the second item, providing the graphical user interface being further based on the match-class descriptor. The computer-implemented method further including: providing, by the processor, an administrative graphical user interface identifying the combination of the first item and the second item and the match-class descriptor; receiving, by the processor, input via administrative graphical user interface modifying the match-class descriptor for the combination of the first item and the second item; identifying, by the processor, the combination of the first item and the second item as reviewed in a computer-accessible matching database; and training, by the processor, a machine learning model based on the modified match-class descriptor for the combination of the first item and the second item. The computer-implemented method where determining the first set of attributes associated with the first item based on description data associated with the first item includes extracting the first set of attributes from a title of the first item in the description data. The computer-implemented method where the set of attribute types includes one or more of: a type of text, an item package size, color, dimension, model number, and descriptive quantity. The computer-implemented method further including: determining, by the processor, an attribute-type indicator for each pairing of attributes in the first set of attributes and the second set of attributes; and computing, by the processor, an attribute value only for pairings of attributes of the first set of attributes and the second set of attributes for which the corresponding attribute-type indicator indicates that there is an attribute type match.

Another general aspect includes A computer-implemented method including: determining, by a processor, a first attribute associated with a first item, the first attributes being associated with a first attribute type; determining, by the processor, a second attribute associated with a second item, the second attribute being associated with a second attribute type; determining, by the processor, an attribute-type indicator for a pairing of the first attribute and the second attribute based on a comparison of the first attribute type with the second attribute type; computing, by the processor, an attribute value for the pairing based on a similarity between the first attribute and the second attribute; inputting, by the processor, the attribute-type indicator and the attribute value for the pairing into a random forest multi-class classifier; determining, by the processor, a match class for a match of the first item and the second item based on output generated by the random forest multi-class classifier; and performing, by the processor, an operation based on the match class for the match of the first item and the second item.

Other embodiments of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

Figure 1:
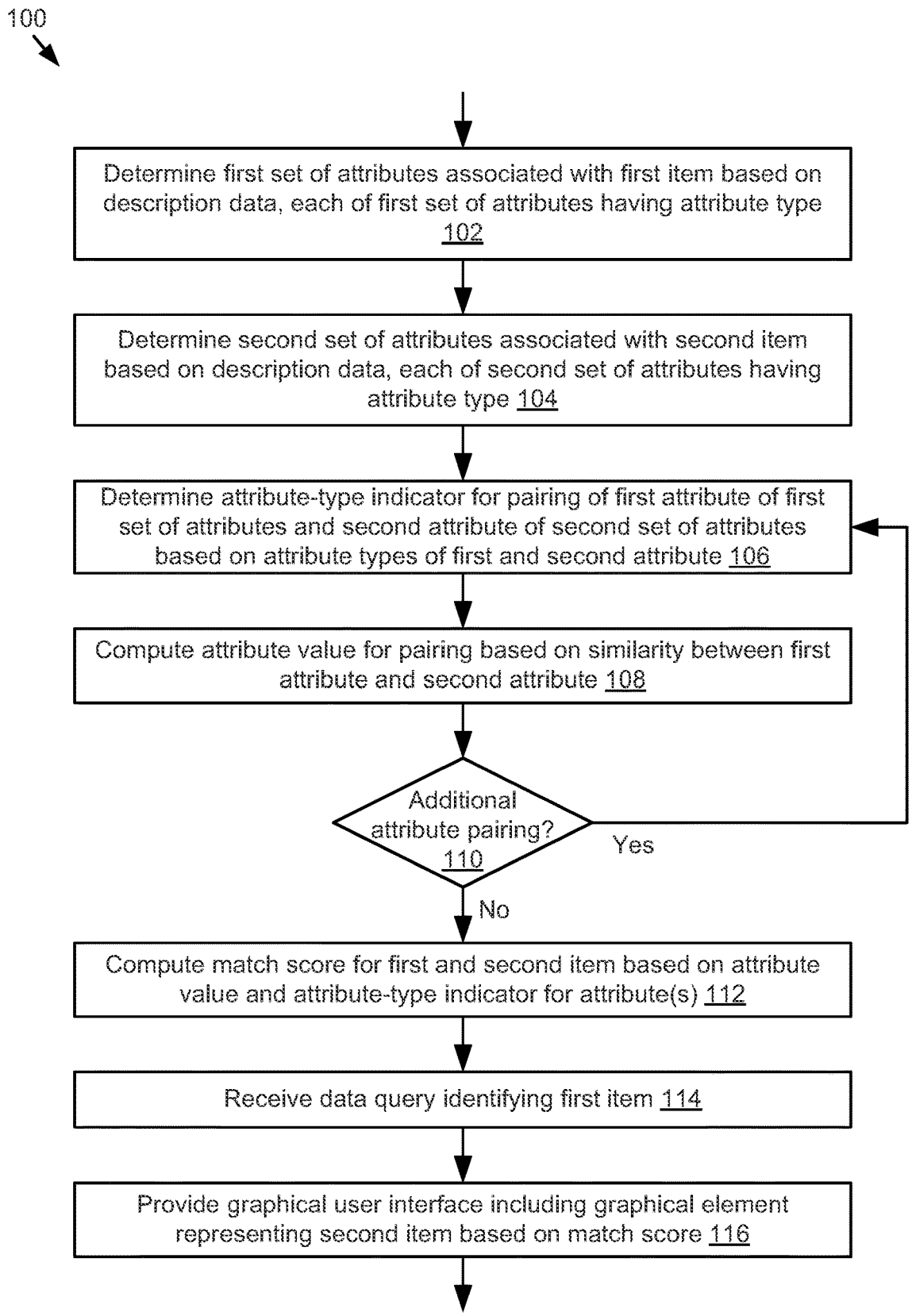
FIG. 1 is a flowchart illustrating an example method for parsing data and automatically determining corollary items using the data.

The present specification generally relates to parsing data to automatically determine corollary items using the data. Some implementations of the technology described herein assess attributes of various items to determine their similarity and, using machine learning algorithms, efficiently match items, for example to determine one or more corollary items to an item identified in a data query.

In some implementations, an item may include a virtual or physical product or service. For example, corollary items may include items that are derived from the items identified in a data query, such as comparable or substantially equivalent items, for example, that may be interchangeable. A corollary or matched item may include, for example, an interchangeable item, such as the same exact item or items with the same or similar attributes that serve a similar purpose.

In some implementations, the technology may identify collections of potentially matching items within a database of items, present those matching items to users for review, and use the review of the users to improve future determination of matching items.

The matches may be used for various purposes, such as determining a replacement item when a requested item is out of stock, providing a competitive quote, for checking competitiveness of an item offering, improving available assortment of items, recommending alternative items, shifting demand to different items, grouping items, or otherwise providing an equivalent or similar item based on a data query identifying a first item.

In some implementations, the technology may identify attributes of items to determine corollary or matching items. For instance, the technology may combine algorithmic item matching with user assessments to build a catalog of similar items. The technology may automatically provide matching items based on a match class representing the level of similarity of the items. In some instances, the technology may provide match-class descriptors identifying a class of similarity of the items, which descriptors may be modified by users (e.g., administrators, stakeholders, etc.). If the descriptors are modified or confirmed by a user, the technology may use the input to adjust the similarity level of the items in a database, and/or tune item similarity models, thereby improving future determinations of similarity of items. An example of possible match-class descriptors may be that an item is identified as a substantially exact match, similar match, or non-match. Another example of match-class descriptors may be that an item is identified as substitutable, suggestable, biddable, or non-match.

The technology described herein provides numerous benefits including addressing the issues noted in the Background. In some implementations, the technology optimizes the accuracy and efficiency of determining corollary or matching items. The technology automatically and efficiently addresses the number and variation of attributes for which calculation is performed, identifies patterns in large datasets that a human would not detect, addresses issues of sparse datasets (e.g., where user interaction data or description of certain attributes is not available), etc. For example, the technology may reduce computation of irrelevant or less relevant attributes, exclude attributes that may skew results and affect computational accuracy, and improve speed and ease of analysis of large datasets, among other benefits.

The technology may automate identification of candidate matches, which may reduce the need to rely on item knowledge or manual catalog searches to identify potential matching items. In some implementations, the technology may prioritize potential matches based on item sales and potential match quality, for example, so that users can review the potential matches with the greatest potential business impact first. In some implementations, the technology may maintain un-reviewed and reviewed matches in a single catalog, thereby eliminating independent matching work streams and potential duplication of work. The technology may improve the quality of automatically generated matches over time by modeling the impact of item attributes and the item user assessments of item similarity.

The features and advantages described herein are not all-inclusive and many additional features and advantages will be apparent to one or ordinary skill in the art in view of the figures and description. Also, it should be noted that the language used in the specification has been selected for readability and instructional purposes and not to limit the scope of the inventive subject matter.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

FIG. 1 is a flowchart illustrating an example method 100 for parsing data and automatically determining corollary items using the data, according to some implementations of the technology described herein. The operations described in FIG. 1 may be further illustrated and described throughout this description. It should also be noted that operations of the method 100 may be omitted, changed, re-ordered, etc., without departing from the scope of this disclosure. It should also be noted that, while the method 100 is described in reference to two items, it may also be used to determine groups, matches, or clusters of 3 or more items (e.g., by repeating the analysis against a reference item, or by comparing 3 or more items at once).

The example method 100 may include determining which attributes of items are relevant to the comparison between items, the level of similarity of the items, and, in some implementations, a weight or importance of each attribute in a determination of an overall similarity of the items.

The matching engine 536 may select two or more items for which to determine a match score, for example, based on the items being within a given category or sub-category of items, an initial similarity information (e.g., being similar in price, size, etc.), a random or sequential matching of items, cross shopping of items by users, etc. For example, the matching engine 536 may select a first and second item from a plurality of items based on a list of reviewed and/or un-reviewed items.

The matching engine 536 may retrieve or receive data about the items, such as description data describing the items (e.g., for an entire set of items or solely for the items being compared) from a database 508 or another component of the system 600, for example. According to some implementations of the technology described herein, the received data may include description data identifying particular items and their attributes (e.g., sizes, quantities, colors, prices, configurations, etc., as described below).

In some implementations, the item description data may include information that may be used to identify, distinguish, and/or describe an item, as described in further detail elsewhere herein. In some instances, the item description may be received from a document (e.g., a table or file with item description data), an image, or manually entered by a user, for example.

In some implementations, at 102, the matching engine 536 may determine a first set of attributes associated with a first item based on description data associated with the first item. In some implementations, each attribute may be associated with an attribute type and/or the matching engine 536 may determine an attribute type for each attribute.

In some implementations, such as when attributes are extracted from unstructured descriptions, the matching engine 536 may perform operations to recognize attributes of interest. For instance, the matching engine 536 may recognize attributes by identifying patterns using regular expressions. For example, product measurements might be expressed in a consistent format within the descriptions, which format may be recognized and the numerical measurements extracted by the matching engine 536 through the use of regular expressions. In another example, descriptions may be tokenized and the matching engine 536 may extract features by identifying tokens from among a defined set of tokens. For instance, the matching engine may extract item colors by identifying tokens corresponding to colors by comparison against a list of tokens containing the names of colors.

An attribute type may include a type, category, kind, or sort of attribute. For instance, the technology may include (e.g., in a database accessible to the matching engine 536) a set of attribute types, which may include definitions of attributes belonging to each attribute type. For example, an attribute type may define attributes that are comparable to one another to determine similarity of attributes belonging to that type.

In some implementations, attribute types of attributes for a particular item may be determined for the item by selecting from a set of available attribute types. For instance, a particular category of items may have a set of attribute types associated therewith, so that the matching engine 536 does not expend computing resources determining whether an attribute belongs to an attribute type that is not included in a set of attribute types for the category of item. For example, the matching engine 536 may determine a category of items to which the first item belongs, determine a set of attribute types for the category, and determine an attribute and attribute type for an item from item description data.

An attribute type may include, for example, a textual description, descriptive quantity, item pack size, item measurements, color, position in hierarchy (e.g., of categories, sub-categories, sub-sub-categories, etc.), model number, brand, absence of word pairs, etc. The attribute types and attributes may be used to evaluate similarity of items, as described in further detail below. For example, the matching engine 536 may determine an overall text similarity of an item description, similarity of item package sizes (e.g., a 2 pack, 3 pack, etc., of items), similarity of color, similarity of measurements, similarity of price, similar model numbers (e.g., for compatibility of ink or toner), similarity of descriptive quantity (e.g., a "5-subject" notebook, a "three-ring" binder, etc.), closeness in item hierarchy, presence or absence of keywords indicating similarity or dissimilarity (e.g., "legal" or "letter" size of paper), similarity of text title, similarity of brand, etc.

In some implementations, the matching engine 536 may extract attributes, such as colors, measurements, quantifiable attributes, etc., directly from item descriptions, such as from the title, overview, specification, etc., information in the description data. In some implementations, the specific attributes and/or attribute types that the matching engine 536 searches for during extraction may vary by department or category of items. For instance, a model number in a description may be extracted for ink or toner, because a cartridge may not be compatible across printers, even though other attributes are similar.

In some implementations, extraction or determination of attributes or attribute types may be performed based on a defined or common formatting. For instance, the matching application may extract specific information from a title, cell in a table, etc., based on formatting or other information (e.g., a descriptive quantity may be listed first in a title, or after a hyphen, etc.).

In some implementations, the extraction of attributes may be limited to a title or specific portion of item description data, for example, to reduce the amount of computer processing expended on extracting attributes or, in some instances, to avoid extraneous, erroneous, or irrelevant attributes.

In some implementations, the determination of attributes and/or attribute types may include keyword search using recognized text, automatic classification using a defined format, or artificial intelligence, for instance.

In some implementations, a keyword search may run recognized text or symbols up against a database of terms to determine and/or classify determined cells. For instance, if text includes the term "SKU:" followed by a string of symbols (e.g., numbers, letters, etc.), the matching engine 536 may determine that the text includes a stock keeping unit (SKU). Similarly, if the text includes "quantity" or "QTY" or similar, the text includes a quantity of the item. Similar methods may be used to extract other attributes or keywords from the item description data.

In some implementations, at 104, the matching engine 536 may determine a second set of attributes associated with a second item based on description data associated with the second item. Each of the second set of attributes may be associated with an attribute type of the set of attribute types. This may be performed in the way described in reference to 102, above.

In some implementations, at 106, the matching engine 536 may determine a first attribute-type indicator for an attribute and/or the pairing of a first attribute of the first set of attributes and a second attribute of the second set of attributes. The attribute type indicator indicates whether an attribute with a particular attribute type is relevant to the comparison of the items. For instance, not all attributes are relevant to a combination of items, for example a chair does not have a descriptive quantity attribute. Accordingly, because descriptions of items may not be standardized and different item data may include different types of attributes, the attribute-type indicator may reduce or eliminate the effect of attributes that should not be compared between the items. It should be noted that although the term "combination" of items is described herein, it does not indicate that the items are being combined, but rather that they are being grouped or matched for purposes of comparison.

The determination may be based on whether a first attribute type of the first attribute matches with a second attribute type of a second attribute of the second set of attributes. For instance, an attribute type pairing may take an attribute from each of the items based on whether the attributes are of the same time. For example, the matching engine 536 may determine whether any of the attribute types for first item's attributes match any of attribute types for the second item's attributes.

The attribute-type indicator indicates whether a pairing of attributes (e.g., one from each item) has the same attribute type. For example, the attribute-type indicator may be zero if a particular attribute from a first item is not relevant (e.g., of the same attribute type) with an attribute of the second item. If the first attribute is relevant to the attribute of the second item, then the attribute-type indicator may be 100, depending on the scale and normalization of the particular implementation, for example.

In some implementations, a set of attributes and their types may be determined for a first of the items having a shorter description. The shorter set of attributes may be used to extract attributes from the second item and/or check for matching attribute types. Similarly, in some implementations, the matching engine 536 may exclude the attributes with zero (e.g., irrelevant or non-matching) attribute-type indicators from further processing (e.g., in 108, 112, 202, 204, etc.) to improve computational efficiency by decreasing processing time, bandwidth use, and/or storage use, for example.

In some implementations, determining an attribute-type indicator may include determining a common set of attribute types for the combination of the first and second item. For example, the common set of attribute types may indicate a reduced set of attributes that are common to the items. For instance, the common set of attribute types may indicate which attributes to compare to determine similarity between the first and second items.

In some implementations, at 108, the matching engine 536 may compute a first attribute value for the pairing of the first attribute and the second attribute based on a similarity between the first attribute and the second attribute. For example, a level of similarity between the pairing of attributes may be determined and a value may be assigned to the pairing for the level of similarity. The value may be from 0-100, depending on the implementation.

In some implementations, the matching engine 536 may compute an attribute value for only those pairings with non-zero attribute-type indicators. For instance, the matching engine 536 may compute an attribute value for the attribute pairings with matching attribute types.

The matching engine 536 may use various operations to quantify attribute similarity, for example, depending on the attribute. In some implementations, the determination may be binary, for example, a match score may be 100 if two items have matching values for a given attribute, and 0 otherwise. In some implementations, similarity scores can be used where there is a varying magnitude or level of similarity between two attributes, or when attribute data is unavailable for some items, as described elsewhere herein.

In some implementations, one measure of similarity might be the presence of the same model number in two product descriptions, where model numbers may be identified and extracted using a regular expression. For example, if the same model number is present in both descriptions, the matching engine 536 may assign a similarity score of 100 for this attribute. If model numbers are present in both descriptions, but the model numbers differ, the matching engine 536 may assign a similarity score of 0 for this attribute. If one or both descriptions do not contain a model number, the matching engine 536 may assign a similarity score of 50 (or another value based on a comparison of similarity) for this attribute to account for the uncertainty.

As another example implementation, the matching engine 536 may compare the overall text similarity between two product titles to determine the similarity. For example, the matching engine 536 may use approximate string matching algorithms such as the Ratcliff/Obershelp algorithm.

In some implementations, the matching engine 536 may normalize the attribute values for the specific pairings of attributes between the first and second item (e.g., with non-zero attribute-type indicators). For instance, a measure of similarity can be normalized to produce a similarity score between 0 and 100, and 100 may, for example, correspond to an exact match between the titles being compared.

In some implementations, at 110, the matching engine 536 may determine whether there are additional attribute pairings for the combination for which to determine attribute-type indicators or attribute values. For instance, the matching engine 536 may track which of the attribute pairings have been evaluated in a database. The matching engine 536 may also maintain data for the pairings, such as attribute-type indicators, attribute values, and/or other data (e.g., weights, etc., as described elsewhere herein).

If the matching engine 536 determines, at 110, that there are additional pairings to evaluate, the method 100 may return to 106 to determine an attribute-type indicator and/or attribute value for the next pairing of attributes for the item combination. This process may repeat until the pairings have been processed, for a defined number of cycles, or until there is another exit condition. If there are no additional pairings to evaluate, the method 100 may continue to 112.

In some implementations, at 112, the matching engine 536 may compute a match score for the first and second items based on the attribute value(s) and attribute-type indicator(s) for attribute pairing(s), such as for the pairing of the first and second attributes based on the first attribute value and first attribute-type indicator determined for the pairing.

Figure 2:
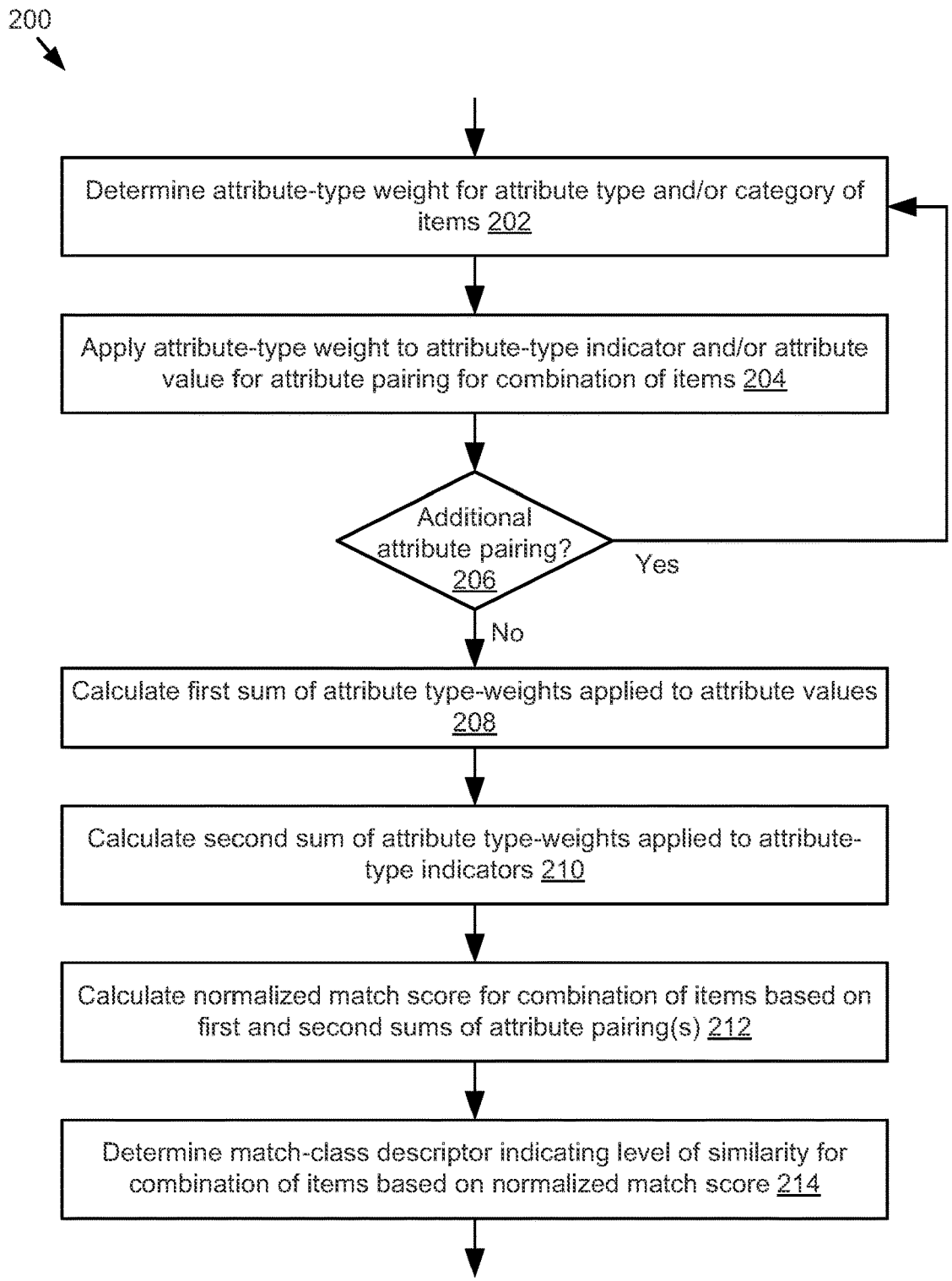
FIG. 2 is a flowchart of an example method for computing match scores of candidate item matches.

In some implementations, a match score for the item match is obtained by computing a weighted sum for relevant attributes, for example, as described in further detail in reference to FIG. 2.

Figure 3:
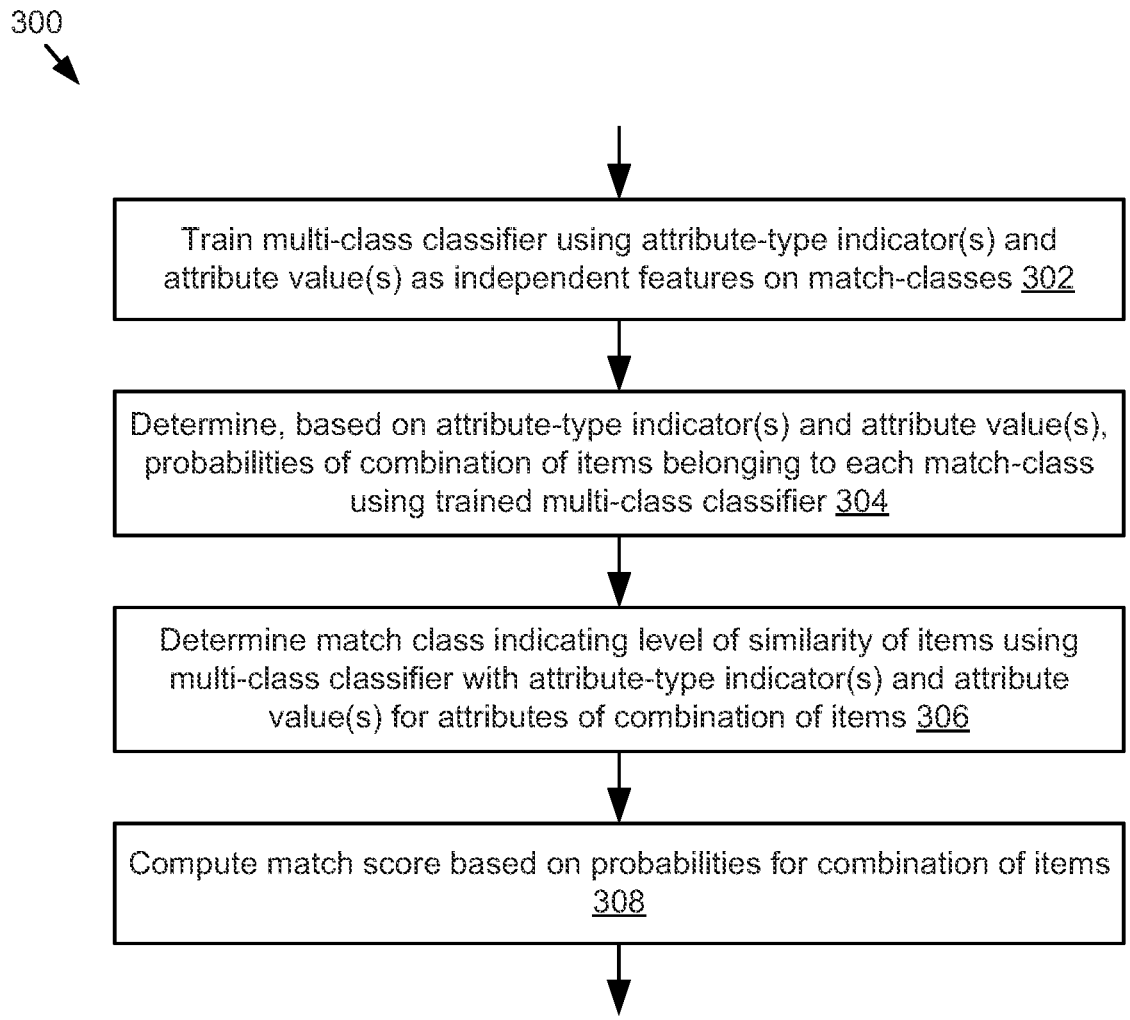
FIG. 3 is a flowchart of an example method for computing match scores of item matches.

In some implementations, the matching engine 536 may determine a match score and/or matching items (e.g., items with a threshold level of similarity) using the attribute-type identifier and/or attribute value as variables in a machine learning algorithm, such as logistic regression, a classifier (e.g., a multi-class classifier, such as a random-forest classifier), neural network, etc., as described in further in reference to FIGS. 2 and 3.

In some implementations, the matching engine 536 may determine a match-class descriptor indicating a level of similarity between the items, for example, based on the match score. The matching engine 536 may determine the match-class descriptor based on a threshold level of a normalized match score for the combination of the first item and the second item. For example, the match-class descriptor may indicate whether the second item is substitutable for the first item.

For instance, the match descriptor may score the quality of match, such as whether the match is a hard substitution, suggestable substitution, biddable substitution, or non-match; or an exact match, a similar match, or non-match. For example, a match score of greater than or equal to 85 (e.g., 85 out of possible match score of 100) may be "exact," a match score of greater than or equal to 60 but less than 85 may be "similar," and a match score of less than 60 may be "non-match." Although, it should be understood that these values of are provided by way of example and other thresholds are possible and contemplated herein, for example, as discussed in reference to FIG. 4.

In some implementations, the matching engine 536 may re-run some or all of the operations of the method 100 (or other methods described herein) periodically or in response to a defined trigger. For instance, when a new item is added to a database of items, the method 100 may run on the database of items to determine a match score of the new item matched with one or more other items in the database. Additionally or alternatively, the database could be refreshed each hour, day, week, etc.

In some implementations, at 114, the matching engine 536 may receive a data query identifying first item, for example, via a graphical user interface, service request, etc. For instance, the matching engine 536 may receive a request to provide data regarding the first item (e.g., a product page, search result, etc.)

In some implementations, at 116, the matching engine 536 may provide a graphical user interface including a graphical element representing the second item based on the match score. For instance, the second item may be provided as an alternative to the first item if the similarity of the items is sufficiently strong. For example, the second item may be provided based on a defined threshold match score and/or a match-class descriptor. In some implementations, the graphical user interface may also indicate the match-class descriptor (e.g., "this item was presented because it is equivalent to the requested item" or similar).

Figure 4:
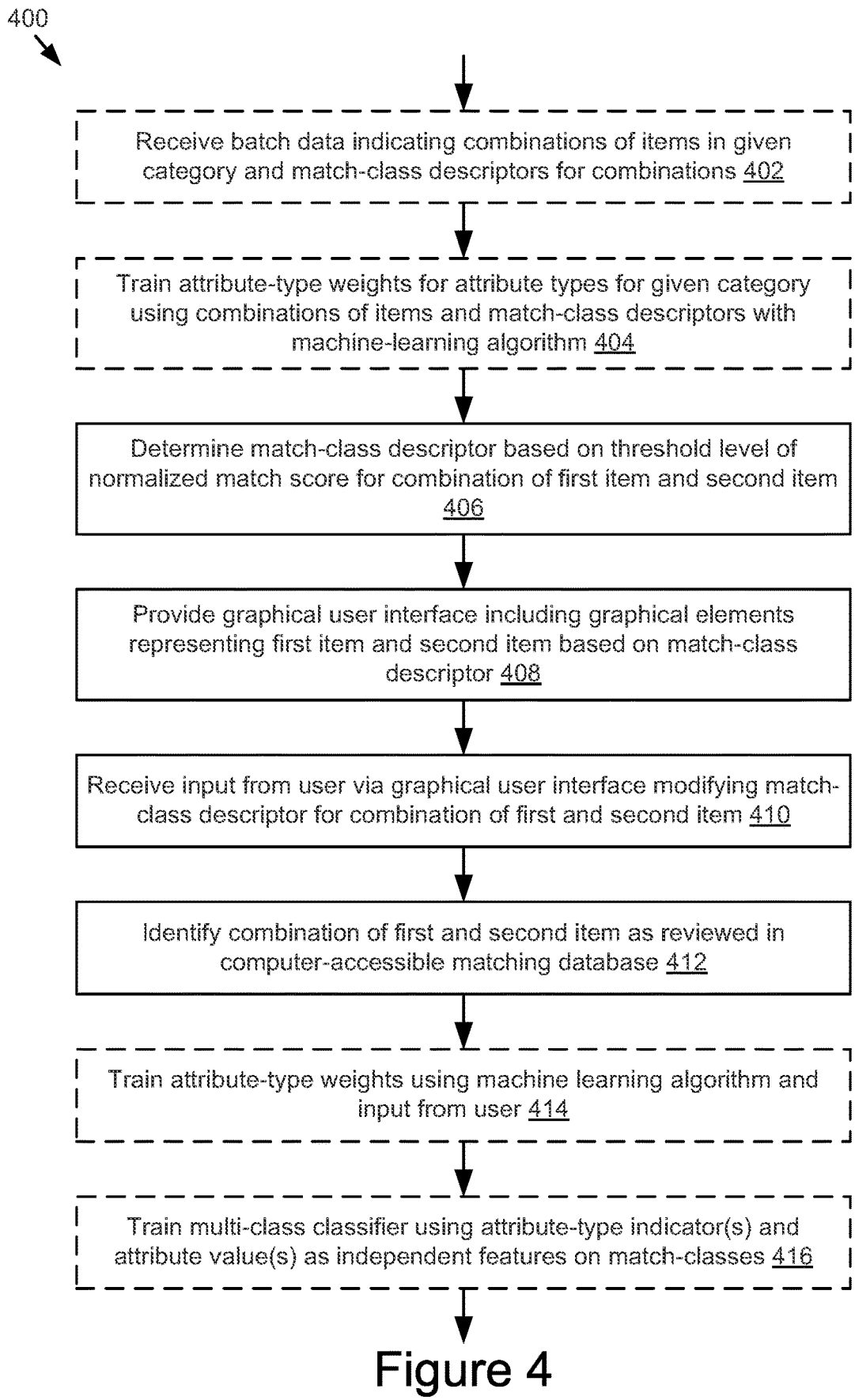
FIG. 4 is a flowchart of an example method for training machine learning models for evaluating item matches.

In some implementations, the graphical user interface may include a selectable element that a user can use to modify the match score or match-class descriptor, for example, as described in reference to 408 in FIG. 4.

In some implementations, the graphical user interface may be adapted based on screen size or shape. For instance, if the screen size or shape on a device on which the graphical user interface is being displayed (e.g., a client device 606) is limited, the graphical user interface may present only those items with a given threshold match score. For example, if the displayable area is smaller than a threshold size, only those items with a corresponding threshold match score and/or match-class descriptor may be shown. For example, if the display can only display graphical elements corresponding to a particular quantity of items, the items may be sorted and displayed based on their match scores or match-class descriptors. Additionally or alternatively, the layout of the graphical user interface may be modified to fit those items with a defined threshold match score or match-class descriptor. For example, graphical elements may be changed in size, shape, format, or other configuration to accommodate the quantity and number of items with the threshold match scores and/or match-class descriptors.

FIG. 2 is a flowchart of an example method 200 for computing match scores of item matches/combinations. The method 200 may use a set of weights to evaluate a match score, for example, to produce a score between 0 and 100. The match score may be used to classify the match, for example, into match classes as described in reference to the match-class descriptors above. In some implementations, the method 200 may use a logistic regression or other machine learning approach to train the weights, for example, as described in reference to FIG. 4. It should be noted that the method 200 may include fewer, additional, or different operations than illustrated herein, and that the operations described in reference to FIG. 2 are provided by way of example.

In some implementations, at 202, the matching engine 536 may determine an attribute-type weight for an attribute type and/or category of items. For example, weights may be assigned to a given attribute type and/or category of items and may represent a relative impact of particular attributes in determining a level of similarity between the items.

In some implementations, the attribute-type weight may be specific to an attribute type within a particular category of items to identify which attributes most heavily determine similarity within that category. For instance, a particular attribute-type may be more important to similarity of some items than others. Accordingly, an attribute type may be weighted differently depending on the category of item(s). For example, price may be more important to a comparison of printers than a comparison of stationary, or color may be more important for a comparison of pens than for a comparison of binders.

In some implementations, at 204, the matching engine 536 may apply the attribute-type weight to a corresponding attribute-type indicator and/or attribute value for the pairing of attributes of the combination of items. For example, an attribute weight may be a value between 0 and 100 or 0 and 1.0, depending on the implementation, which may be multiplied with an attribute value and/or attribute-type indicator.

In some implementations, the selection and values of the attribute-type weights may be modified based on the set of attribute types for a given pairing of attributes when determining a similarity of the items. For instance, once the weights for the pairings of attributes for a combination of a first and second item are determined, the weights may be normalized (or re-normalized) for the combination based on the relevant attributes for the combination (e.g., for those attributes present in the description data or with non-zero attribute-type indicators). For example, the weights for relevant attributes may sum to 1 and be non-negative.

In some implementations, at 206, the matching engine 536 may determine whether there are additional attribute pairings for the combination of items. For instance, as described above, the matching engine 536 may track which of the attributes and/or pairings have had the weights applied thereto.

If the matching engine 536 determines, at 206, that there are additional attribute pairings for which to apply a weight, the method 200 may return to 202 to determine and apply attribute-type weights for the remaining attributes or attribute pairings. This process may repeat until the pairings have been weighted, for a defined number of cycles, or until there is another exit condition. If there are no additional pairings to evaluate, the method 200 may continue to 208.

It should be noted that although determination and application of attribute-type indicators, attribute values, and attribute-type weights are described separately and in a given order, they may be performed together or in a different order than described. For instance, the attribute-type indicator, attribute value, and attribute weight for a particular attribute pairing may be determined and, in some instances, combined according to the technology described herein, before moving on to performing the operations for a subsequent pairing of attributes for a combination of items.

In some implementations, at 208, the matching engine 536 may calculate a first sum of attribute type-weights applied to attribute values. For example, attribute-type weights may be multiplied with attribute values for each attribute pairing and the product may be summed over the pairings (e.g., as illustrated in reference to 212 below) for the combination of items.

Similarly, in some implementations, at 210, the matching engine 536 may calculate a second sum of attribute type-weights applied to (e.g., multiplied with) attribute-type indicators. For example, attribute-type weights may be multiplied with attribute-type indicators for each attribute pairing and the product for each pairing may be summed over the pairings (e.g., as illustrated in reference to 212 below) for the combination of items. In some implementations, the product of the attribute-type indicator, attribute value, and attribute-type weight may be determined and then summed across the pairings of attributes. The sum may be normalized and provided as a match-score.

In some implementations, at 212, the matching engine 536 may calculate a normalized match score for the combination of items based on the first (e.g., for the attribute-type indicators) and/or second (e.g., for the attribute values) sums for the attribute pairing(s). For example, a final match score may be obtained by computing a normalized weighted sum of relevant attributes. The calculations may be performed for each attribute or for each attribute pairing, depending on the implementation.

Using these quantities for a match, an overall match score may be computed using:

$$\text{score} = 100 \times \frac{\sum_{i=1}^{n} w_i f_i}{\sum_{i=1}^{n} w_i d_i},$$

where $f_i$ is the attribute value (e.g., between 0-100, where a lower score indicates lower similarity) determined for an attribute i; $d_i$ is the attribute-type indicator (e.g., 0 if the attribute i is not relevant or 100 if the attribute i is relevant); and $w_i$ is the attribute-type weight (e.g., between 0-100) assigned to attribute i. The overall match score may be determined to be between 0-100 (or some other scale, depending on the implementation).

In some implementations, at 214, the matching engine 536 may determine a match-class descriptor indicating a level of similarity for the combination of items based on the normalized match score. For example, as described in further detail elsewhere herein, various match-class descriptors may be determined based on various threshold levels of match score. For instance, the match-class descriptor may indicate a level of similarity or substitutability of the first item with the second item. Providing the graphical user interface may be further based on the match-class descriptor, as described in reference to FIGS. 1 and 4.

FIG. 3 is a flowchart of an example method 300 for computing match scores of combinations of items. The method 300 uses the attribute-type indicators and/or attribute values described above with a machine learning algorithm. For example, the machine learning algorithm may include a supervised machine learning algorithm, such as a multi-class classifier, random forest multi-class classifier, neural network, etc., although other possibilities are also contemplated herein. In some implementations, a match-class descriptor and/or match score may be evaluated directly from a classifier and, in some instances, a score may be derived from classification probabilities for each match class. It should be noted that the method 300 may include fewer, additional, or different operations than illustrated herein, and that the operations described in reference to FIG. 3 are provided by way of example.

In some implementations, at 302, the matching engine 536 may train a multi-class classifier using attribute-type indicator(s) and attribute value(s) as independent features on match classes (e.g., using match-class descriptors). For example, an example method for training a machine learning model is described in reference to FIG. 4.

In some implementations, at 304, the matching engine 536 may determine, based on attribute-type indicator(s) and/or attribute value(s), probabilities of the combination of items (e.g., the first and second item described above) belonging to each match-class using trained multi-class classifier. For example, the attribute-type indicator(s) and attribute value(s) for a combination of a first and second item may be input into a trained classifier, such as a random forest multi-class classifier to determine the probabilities. For instance, a random forest multi-class classifier may show up to a twenty percent increase in accuracy over other methods in a four class classification.

In some implementations, for certain types of classification models, class probabilities may automatically be returned as part of a model's output. For example, when the matching engine 536 uses a random forest classifier, match-class probabilities may be part of the output from the classifier. In the example of a random forest, the model may include a collection of distinct classification trees. For instance, when provided with an input, each classification tree may produce its own classification. The proportion of trees selecting a particular class for a given set of input features may be interpreted as a probability that the given input belongs to the particular class.

In some implementations, at 306, the matching engine 536 may determine a match class (and/or match-class descriptor) indicating a level of similarity of items using attribute-type indicator(s) and attribute value(s) with a multi-class classifier. The match class may be evaluated directly from the output of the classifier, such as the probabilities.

In some implementations, at 308, the matching engine 536 may compute a match score based on the classification probabilities for each match class for the combination of items.

For example, a match score from classification probabilities for each match class may be computed using: score=$100p_1+80p_2+65p_3+40p_4$, where $p_i$ indicates the probability that the combination of items is in class i, where the subscripts indicate match classes of descending strength.

FIG. 4 is a flowchart of an example method 400 for training a model for evaluating item matches/combinations using various example machine learning algorithms. In some implementations, the model trained in FIG. 4 may be used to determine the attribute-type weights, match classes, and/or match scores described above. For example, the model may be trained using a supervised learning algorithm, such as logistic regression, neural network, random forest multi-class classifier, etc. It should be noted that the method 400 may include fewer, additional, or different operations than illustrated herein, and that the operations described in reference to FIG. 4 are provided by way of example.

In some implementations, different models may be trained for different categories of items to model the impact of item attributes and user assessments (e.g., by users) on item similarity for items in various categories.

In some implementations, at 402, the matching engine 536 may receive batch data indicating combinations of items in given category and match-class descriptors (and/or match scores) for the combinations. For example, an initial set of attribute-type weights maybe determined manually, run through the above-described operations, and fed into the machine learning algorithm. In some instances, combinations of items are manually determined with subjective match-class descriptors, which can then be fed into a machine learning algorithm, for example, to train a model and/or weights.

In some implementations, the batch data may include combinations of items with attributes already scored or made. The batch data file may be uploaded to the matching engine 536, for example, as a CSV (comma separated values) format file, which may include matches, attributes, weights, or other information.

In some implementations, at 404, the matching engine 536 may train attribute-type weights for attribute types for a given item category using item matches and match-class descriptors with the machine-learning algorithm.

In some implementations, the matching engine 536 may train the weights using a logistic regression-based algorithm. Attribute-type weights may be selected (e.g., for tuning or re-tuning the model) for a category, so that the match classes (e.g., represented by the match-class descriptors) match defined match scores. For example, a match score of greater than or equal to 85 (out of a possible normalized match score of 100) may be "exact," a match score of greater than or equal to 60 but less than 85 may be "similar," and a match score of less than 60 may be "non-match." Attribute-type weights for an exact match may therefore satisfy a condition:

$$\sum_{i=1}^{n} w_i(100 f_i - 85 d_i) \geq 0.$$

Attribute-type weights for a similar match may therefore satisfy conditions:

$$\sum_{i=1}^{n} w_i(100 f_i - 85 d_i) < 0 \text{ and } \sum_{i=1}^{n} w_i(100 f_i - 60 d_i) \geq 0.$$

Attribute-type weights for a non-match may therefore satisfy a condition:

$$\sum_{i=1}^{n} w_i(100 f_i - 60 d_i) < 0.$$

Although, it should be understood that a different number of match classes or different threshold values may be used.

It should be noted that it might not be feasible to find one set of weights that are consistent with all provided match classes (e.g., user-defined classes provided in batch data or user correction at 410). To find weights that are as consistent as possible with the provided match classes, the matching engine 536 may minimize a sum of negative log-logistic functions, where the sum is taken over the set of match samples. The weights may be constrained to satisfy:

$$\sum_{i=1}^{n} w_i = 1$$

and $w_i \geq 0$ for all i.

For example, a negative log-logistic function may be used to train the attribute-type weights. The negative log-logistic function (denoted by σ) may be: σ(z)=log(1+e(−z)).

The components of the sum for the negative log-logistic function may be:

For exact matches:

$$\sigma\left(\sum_{i=1}^{n} w_i(100 f_i - 85 d_i)\right).$$

For similar matches:

$$\frac{1}{2}\left(\sigma\left(\sum_{i=1}^{n} w_i(85 d_i - 100 f_i)\right) + \sigma\left(\sum_{i=1}^{n} w_i(100 f_i - 60 d_i)\right)\right).$$

For non-matches:

$$\sigma\left(\sum_{i=1}^{n} w_i(60 d_i - 100 f_i)\right).$$

In some implementations, as an alternative, the matching engine 536 may directly treat each attribute value (denoted by $f_i$) and attribute-type indicator (denoted by $d_i$) as independent features and train a multi-class classifier on the various match classes. The matching engine 536 may then evaluate the match class and/or match score (e.g., based on classification probabilities), for example, as described in reference to FIG. 3.

In some implementations, at 406, the matching engine 536 may determine match-class descriptor based on a threshold level of the normalized match score for the combination of first item and second item. For example, the match score and corresponding match-class descriptor may be determined for a particular combination of items, such as is described in reference to FIG. 1.

The combination of items may be flagged as needing a review by an administrator (e.g., a user with a defined role). The combination may be flagged for review based on its match score, match class, position in a list of items or matching database.

In some implementations, at 408, the matching engine 536 may provide a graphical user interface including graphical elements representing first item and second item based on match-class descriptor. For example, the graphical user interface may include an administrative graphical user interface that identifies the combination of the first and second items as well as the match score and/or match-class descriptor. The administrative graphical user interface may provide the user the ability to go through items and corresponding matches to confirm or modify the match-class descriptors for the matches, for example, by receiving input from the user, as described at 410.

In some implementations, the items or matches may be presented in a defined order to prioritize potential matches based on volume of sales of the item, match quality (e.g., based on match score or match class), etc. In some implementations, in order to avoid duplication of work by different users, reviewed and un-reviewed matches may be maintained in a single matching database and their order may be changed based on whether they have been reviewed. For instance, a reviewed item may be bumped to the end of the list of items for review. For example, items may be flagged, tagged, or sorted based on these factors.

In some implementations, at 410, the matching engine 536 may receive input from a user via the administrative graphical user interface. The input may modify or confirm, for example, a match-class descriptor for combination of first and second item. For example, a user may manually override suggested match classes for individual item combinations. The manual overrides may provide data that can be used to re-tune attribute weights via supervised learning. For example, the reviewed matches may provide match scores, weights, attribute-type indicators, etc., as inputs to a machine learning algorithm, which may use the input to re-tune the model for the category of items. In some instances, the input may store a new match-class descriptor for the combination of items in the matching database, so that the manually programmed version may be used instead of the machine learning generated version.

In some implementations, if multiple users review a match and their input varies, the input that takes priority may be based on a role-based hierarchy. For instance, input from a higher ranking administrator or a user with a more consistent review history may override input of a lower ranking user. Additionally or alternatively, the match may be identified for a third review.

In some implementations, a non-administrative user may provide input (e.g., via the graphical user interface described at 116 in FIG. 1) modifying the match-class descriptors and, in some implementations, the non-administrative users' input may be further reviewed by an administrative user to confirm the changes for re-tuning of the machine learning model.

In some implementations, the user input can be transformed by the matching engine 536 to enable the use of standard linear classification models for weight tuning, for example. For instance, the input may be transformed as described above in reference to the operation at 402-404.

In some implementations, at 412, the matching engine 536 may identify a combination of items as reviewed in computer-accessible matching database. For instance, the matching engine 536 may mark (e.g., flag or un-flag) the item as reviewed, send it to the end of the queue of items for review, remove it from a list or set of entries, etc.

In some implementations, at 414, the matching engine 536 may train attribute-type weights using the machine learning algorithm and input from a user. For instance, the matching engine 536 may use the manual overrides provided via the input to re-tune attribute-type weights via supervised learning. The re-tuning may be performed separately for each category of items. The re-tuning of the model may be performed as described above in reference to 404. Accordingly, the performance of the model may improve over time based on user input.

In some implementations, at 416, the matching engine 536 may train a multi-class classifier using attribute-type indicator(s) and attribute value(s) as independent features on match-class. For example, as described above, the input maybe used to re-train the multi-class classifier (e.g., a random forest multi-class classifier) using attribute-type indicators, attribute values, match scores, and/or match classes.

In some implementations, the training process using one or more of the operations of the example method 400 may be repeated by the matching engine 536 periodically or in response to a defined trigger. For example, the process may run at night or at some other periodicity. It may also refresh the matching database to remove items that are no longer available and/or add new items (e.g., using the operations of the method 100 in FIG. 1) to the matching database.

Figure 5:
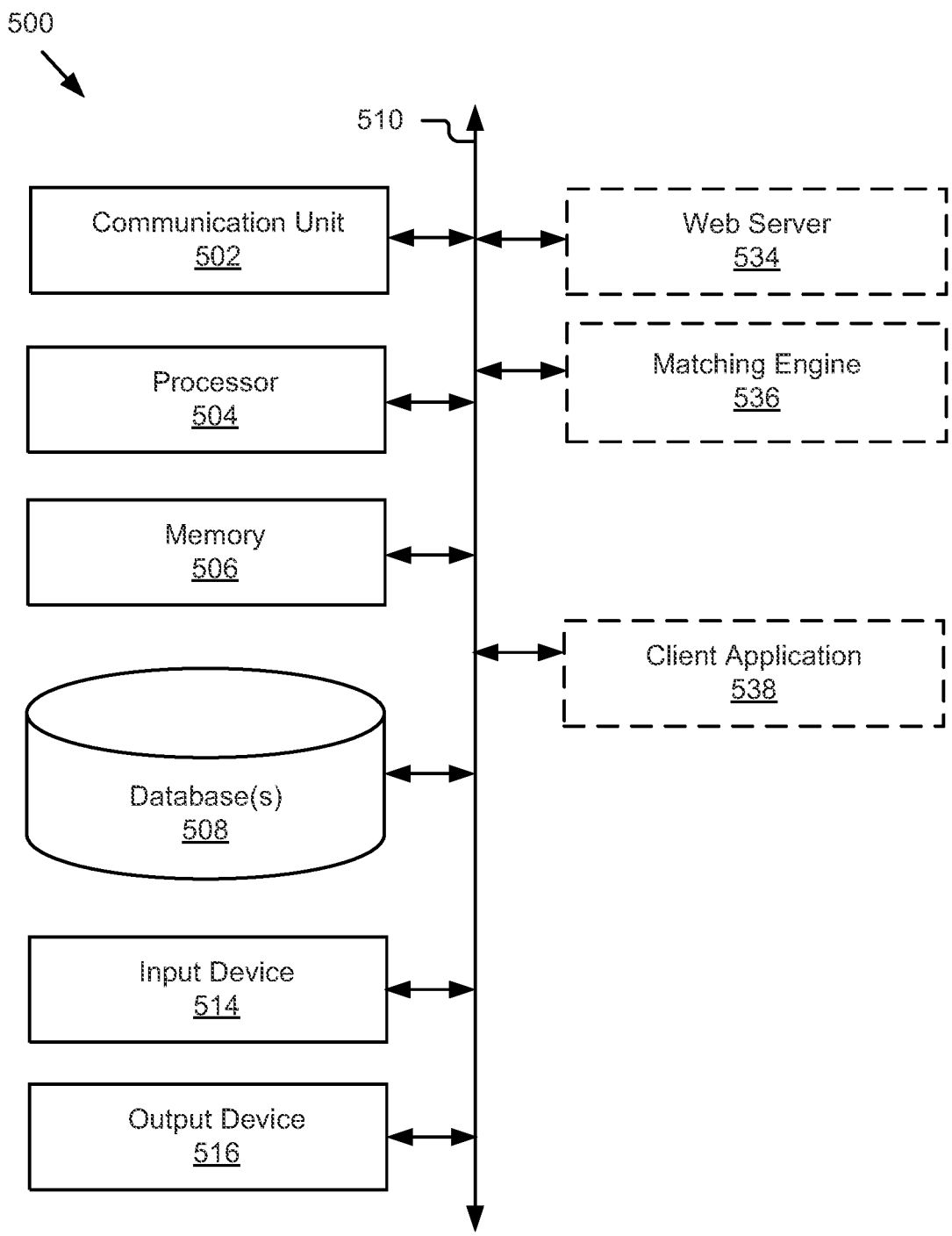
FIG. 5 is a block diagram of an example computing device for executing code and routines according to the technology described herein.
Figure 6:
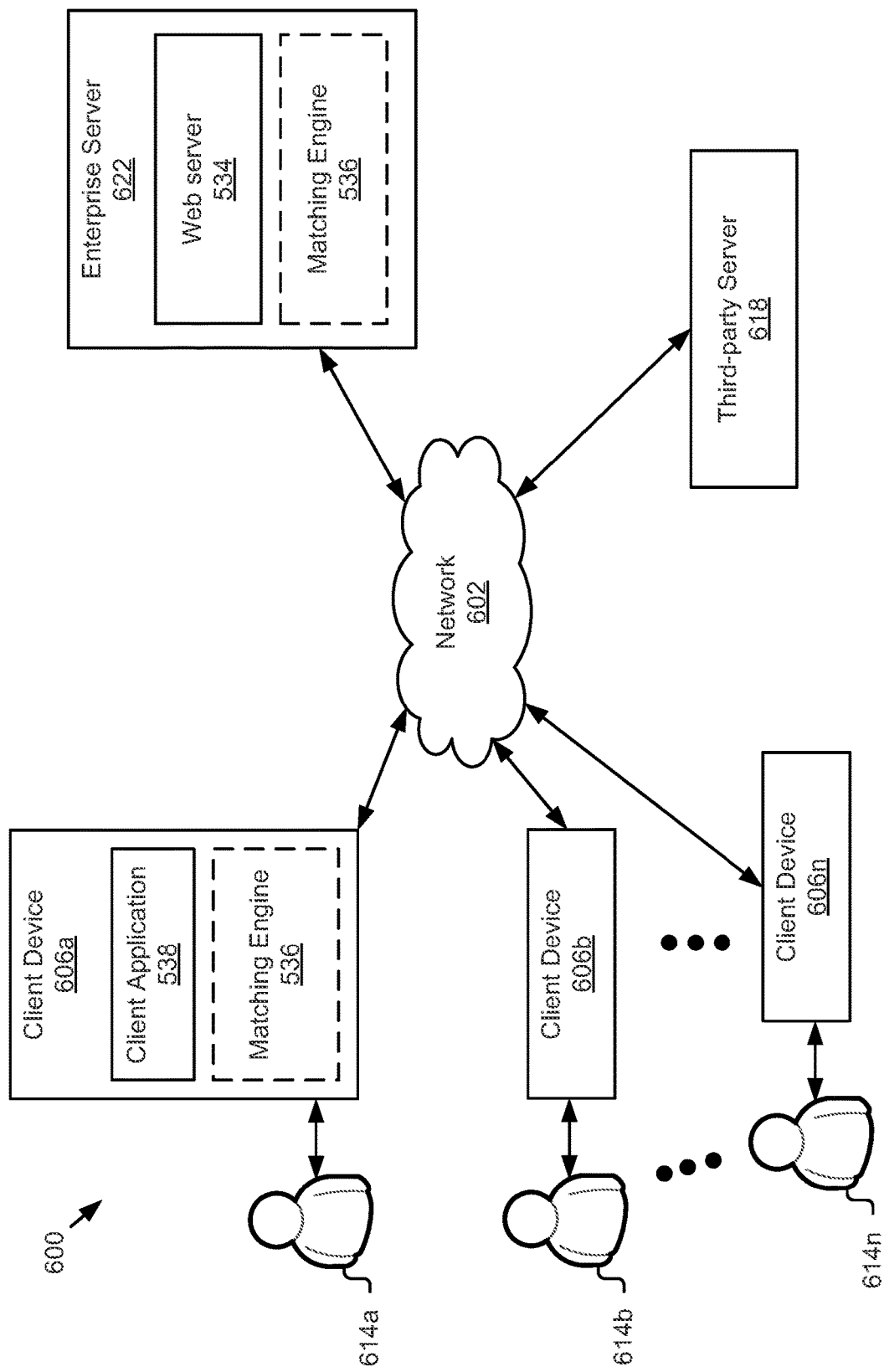
FIG. 6 is a block diagram of an example system for determining item matches.

An example computing system 500 of the technology is depicted in FIG. 5. This computing system 500 may represent the computer architecture of a client device 606, a third-party server 618, and/or an enterprise server 622, as depicted in FIG. 6, and may include different components depending on the implementation being represented.

As depicted in FIG. 5, the computing system 500 may include one or more of a web server 534, a matching engine 536, and a client application 538, depending on the configuration. For instance, a client device 606 may include one or more of the client application 538, the matching engine 536, and/or components thereof, although it should be understood that other configurations are also possible, such as configurations where the client application 538 and the matching engine 536 are combined into a single entity or further distributed into additional components. The enterprise server 622 may include the web server 534, the matching engine 536, and/or components thereof, the database(s) 508, etc., although other configurations are also possible and contemplated.

The client devices 606 may also store and/or operate other software, such as an operating system, other applications, etc., that may be configured to interact with the enterprise server 622 via the network 602.

The client device 606 includes one or more computing devices having data processing and communication capabilities. The client device 606 may couple to and communicate with other client devices 606 and the other entities of the system 600 via the network 602 using a wireless and/or wired connection. Examples of client devices 606 may include mobile phones, tablets, laptops, desktops, netbooks, server appliances, servers, virtual machines, TVs, etc. The system 600 may include any number of client devices 606, including client devices of the same or different type.

The web server 534 includes computer logic executable by the processor 504 to receive, process, and respond to content requests. The web server 534 may include an HTTP server, a REST (representational state transfer) service, or other suitable server type. The web server 534 may receive content requests (e.g., page requests, order requests, other requests (e.g., HTTP), etc.) from client devices 606, cooperate with the matching engine 536 to determine content (e.g., as described in reference to FIGS. 1-4), retrieve and incorporate data from the database(s) 508, format the content, and provide the content to the client devices 606. In some instances, the web server 534 may format the content using a web language and provide the content to a corresponding client application 538 for processing and/or rendering to the user for display, although other variations are also possible.

The web server 534 may be coupled to the database(s) 508 to store retrieve, and/or manipulate data stored therein and may be coupled to the matching engine 536 to facilitate its operations. For example, the web server 534 may allow a user on a client device 606 to communicate with the matching engine 536.

The matching engine 536 includes computer logic executable by the processor 504 to parsing data to automatically determine matching items, train models using the data, as well as provide other operations described herein. The matching engine 536 may store and provide access to item information (e.g., images, descriptions, categories, specifications, reviews, ratings, retailers, prices, historically offered prices, quantities, attributes, approval criteria, parameters, etc.) in the database(s) 508.

The matching engine 536 may also receive, manage, analyze, store, and provide access to item data. The matching engine 536 may communicate with the web server 534 to facilitate its operations and may be coupled to the database(s) 508 to store retrieve, and/or manipulate data stored therein. For example, the matching engine 536 may retrieve item data from a third-party server 618 and store it in the database(s) 508.

The matching engine 536 may include software including logic executable by the processor 504 to perform its respective acts, although in further embodiments the matching engine 536 may be implemented in hardware (one or more application specific integrated circuits (ASICs) coupled to the bus 510 for cooperation and communication with the other components of the system 500; sets of instructions stored in one or more discrete memory devices (e.g., a PROM, FPROM, ROM) that are coupled to the bus 510 for cooperation and communication with the other components of the system 500; a combination thereof; etc.).

The client application 538 includes computer logic executable by the processor 504 on a client device 606 to provide for user interaction, receive user input, present information to the user via a display, and send data to and receive data from the other entities of the system 600 via the network 602. In some implementations, the client application 538 may generate and present user interfaces based at least in part on information received from the matching engine 536 and/or the web server 534 via the network 602. In some implementations, the client application 538 includes a web browser and/or code operable therein, a customized client-side application (e.g., a dedicated mobile app), a combination of both, etc.

The web server 534, the matching engine 536, and/or the client application 538 may require users to authenticate using known web authentication protocols in order to determine if they have permission to invoice an order to a customer account, as discussed further herein.

As depicted, the computing system 500 may include a processor 504, a memory 506, a communication unit 502, an output device 516, an input device 514, and database(s) 508, which may be communicatively coupled by a communication bus 510. The computing system 500 depicted in FIG. 5 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 500 may include various operating systems, sensors, additional processors, and other physical configurations. Although, for purposes of clarity, FIG. 5 only shows a single processor 504, memory 506, communication unit 502, etc., it should be understood that the computing system 500 may include a plurality of one or more of these components.

The processor 504 may execute software instructions by performing various input, logical, and/or mathematical operations. The processor 504 may have various computing architectures to process data signals including, for example, a complex instruction set computer (CISC) architecture, a reduced instruction set computer (RISC) architecture, and/or an architecture implementing a combination of instruction sets. The processor 504 may be physical and/or virtual, and may include a single core or plurality of processing units and/or cores. In some implementations, the processor 504 may be capable of generating and providing electronic display signals to a display device, supporting the display of images, capturing and transmitting images, performing complex tasks including various types of feature extraction and sampling, etc. In some implementations, the processor 504 may be coupled to the memory 506 via the bus 510 to access data and instructions therefrom and store data therein. The bus 510 may couple the processor 504 to the other components of the computing system 500 including, for example, the memory 506, the communication unit 502, the input device 514, the output device 516, and the database(s) 508.

The memory 506 may store and provide access to data to the other components of the computing system 500. The memory 506 may be included in a single computing device or a plurality of computing devices. In some implementations, the memory 506 may store instructions and/or data that may be executed by the processor 504. For example, the memory 506 may store one or more of a web server 534, a matching engine 536, a client application 538, and their respective components, depending on the configuration. The memory 506 is also capable of storing other instructions and data, including, for example, an operating system, hardware drivers, other software applications, databases, etc. The memory 506 may be coupled to the bus 510 for communication with the processor 504 and the other components of computing system 500.

The memory 506 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 504. In some implementations, the memory 506 may include one or more of volatile memory and non-volatile memory (e.g., RAM, ROM, hard disk, optical disk, etc.). It should be understood that the memory 506 may be a single device or may include multiple types of devices and configurations.

The bus 510 can include a communication bus for transferring data between components of a computing device or between computing devices, a network bus system including the network 602 or portions thereof, a processor mesh, a combination thereof, etc. In some implementations, the web server 534, matching engine 536, client application 538, and various other components operating on the computing system 500 (operating systems, device drivers, etc.) may cooperate and communicate via a communication mechanism included in or implemented in association with the bus 510. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., using SSH, HTTPS, etc.).

The communication unit 502 may include one or more interface devices (I/F) for wired and wireless connectivity among the components of the system 600. For instance, the communication unit 502 may include various types known connectivity and interface options. The communication unit 502 may be coupled to the other components of the computing system 500 via the bus 510. The communication unit 502 may be electronically communicatively coupled to the network 602 (e.g., wiredly, wirelessly, etc.). In some implementations, the communication unit 502 can link the processor 504 to the network 602, which may in turn be coupled to other processing systems. The communication unit 502 can provide other connections to the network 602 and to other entities of the system 600 using various standard communication protocols.

The input device 514 may include any device for inputting information into the computing system 500. In some implementations, the input device 514 may include one or more peripheral devices. For example, the input device 514 may include a keyboard, a pointing device, microphone, an image/video capture device (e.g., camera), a touch-screen display integrated with the output device 516, etc.

The output device 516 may be any device capable of outputting information from the computing system 500. The output device 516 may include one or more of a display (LCD, OLED, etc.), a printer, a haptic device, audio reproduction device, touch-screen display, etc. In some implementations, the output device is a display which may display electronic images and data output by the computing system 500 for presentation to a user 106. In some implementations, the computing system 500 may include a graphics adapter (not shown) for rendering and outputting the images and data for presentation on output device 516. The graphics adapter (not shown) may be a separate processing device including a separate processor and memory (not shown) or may be integrated with the processor 504 and memory 506.

The database(s) are information source(s) for storing and providing access to data. The data stored by the database(s) 508 may organized and queried using various criteria including any type of data stored by them, such as item identifier, item attributes, item name, matches, categories, attribute-type indicators, attribute values, attribute-type weights, user input, reviewed or un-reviewed flags, etc. For example, the database(s) 508 may include the matching database described herein. As discussed above, in some implementations, the technology may maintain un-reviewed and reviewed matches in a single catalog, eliminating independent matching work streams and potential duplication of work.

The database(s) 508 may include file systems, data tables, documents, databases, or other organized collections of data. Examples of the types of data stored by the database(s) 508 may include invoice data, item data, business account data, purchase data, user profile data, etc.

The components of the computing system 500 may be communicatively coupled by the bus 510 and/or the processor 504 to one another. In some implementations, the components 534, 536, and/or 538 may include computer logic (e.g., software logic, hardware logic, etc.) executable by the processor 504 to provide their acts and/or functionality. In any of the foregoing implementations, these components 534, 536, and/or 538 may be adapted for cooperation and communication with the processor 504 and the other components of the computing system 500.

The database(s) 508 may be included in the computing system 500 or in another computing system and/or storage system distinct from but coupled to or accessible by the computing system 500. The database(s) 508 can include one or more non-transitory computer-readable mediums for storing the data. In some implementations, the database(s) 508 may be incorporated with the memory 506 or may be distinct therefrom. In some implementations, the database(s) 508 may store data associated with a database management system (DBMS) operable on the computing system 500. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

FIG. 6 is a block diagram of an example system 600 for parsing data to automatically determine corollary items, attributes, match scores, and/or match classes using the data. The illustrated system 600 may include a client device 606a . . . 606n (also referred to herein individually and/or collectively as 606), a third-party server 618, and an enterprise server 622, which are electronically communicatively coupled via a network 602 for interaction with one another, although other system configurations are possible including other devices, systems, and networks. For example, the system 600 could include any number of client devices 606, third-party servers 618, enterprise servers 622, and other systems and devices. The client devices 606a . . . 606n, and their components, may be coupled to the network 602. The enterprise server 622 and its components may be coupled to the network 602. The third-party server 618 and its components may be coupled to the network 602. The users 614a . . . 614n may access one or more of the devices of the system 600. For example, as depicted, a user 614a may access and/or interact with the client device 606a, a user 614b may access and/or interact with the client device 606b, and a user 614n may access and/or interact with the client device 606n.

The network 602 may include any number of networks and/or network types. For example, the network 602 may include one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

A plurality of client devices 606a . . . 606n are depicted in FIG. 6 to indicate that the enterprise server 622 and its components may services to a multiplicity of users 614a . . . 614n on a multiplicity of client devices 606a . . . 606n. In some implementations, a single user may use more than one client device 606, which the enterprise server 622 may receive and manage data associated with the user and use to perform its acts and/or functions as discussed elsewhere herein.

The enterprise server 622 and the third-party server 618 have data processing, storing, and communication capabilities, as discussed elsewhere herein. For example, the servers 622 and/or 618 may include one or more hardware servers, server arrays, storage devices and/or systems, etc. In some implementations, the servers 622 and/or 618 may include one or more virtual servers, which operate in a host server environment. As depicted, the enterprise server 622 may include the matching engine 536 and the web server 534, as discussed elsewhere herein.

Third-party server 618 can host services such as a third-party application (not shown), which may be individual and/or incorporated into the services provided by the enterprise server 622. In some implementations, the third-party application provides additional acts and/or information such as user input, batch matching data, item data, item attributes, web analytics, etc., to the enterprise server 622 for storage in the database(s) 508, and/or use by the matching engine 536.

It should be understood that the system 600 illustrated in FIG. 6 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Methods are described herein; however, it should be understood that the methods are provided by way of example, and that variations and combinations of these methods, as well as other methods, are contemplated. For example, in some embodiments, at least a portion of one or more of the methods represent various segments of one or more larger methods and may be concatenated or various steps of these methods may be combined to produce other methods which are encompassed by the present disclosure. Additionally, it should be understood that various operations in the methods may in some cases be iterative, and thus repeated as many times as necessary generate the results described herein. Further the ordering of the operations in the methods is provided by way of example and it should be understood that various operations may occur earlier and/or later in the method without departing from the scope thereof.

In some instances, various implementations may be presented herein in terms of algorithms and symbolic representations of operations on data bits within a computer memory. An algorithm may be here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
    determining, by a processor, a first attribute-type weight for a first attribute type, the first attribute-type weight indicating an impact of the first attribute type in determining similarity between items;
    determining, by the processor, a first attribute of the first attribute type for a first item and a second attribute of the first attribute type for a second item, a first and second item pairing including the first item and the second item;
    determining, by the processor, a first attribute value for the first attribute and the second attribute, the first attribute value indicating a first level of similarity between the first attribute and the second attribute;
    modifying, by the processor, the first attribute value using the first attribute-type weight;
    computing, by the processor, a match score for the first and second item pairing based on the modified first attribute value; and
    in response to receiving a data query identifying the first item, providing, by the processor, a graphical user interface including a graphical element representing the second item based on the match score.

2. The computer-implemented method of claim 1, wherein determining the first attribute-type weight for the first attribute type includes:
    receiving a training data set indicating combinations of items having the first attribute type;
    receiving a plurality of match-class descriptors associated with match scores for the combinations of items; and
    training the first attribute-type weight using the training data set and the plurality of match-class descriptors.

3. The computer-implemented method of claim 1, further comprising:
    determining, by the processor, the first item and the second item from a category of items, the category being selected from a plurality of categories; and
    determining, by the processor, the first attribute-type weight from a plurality of attribute-type weights based on the selected category of items.

4. The computer-implemented method of claim 3, wherein:
    the plurality of attribute-type weights for the plurality of categories each describe a common attribute type.

5. The computer-implemented method of claim 1, further comprising:
    determining, by the processor, a second attribute-type weight for a second attribute type, the second attribute-type weight indicating an impact of the second attribute type in determining similarity between the items;
    determining, by the processor, a third attribute of the second attribute type for the first item and a fourth attribute of the second attribute type for the second item;
    determining, by the processor, a second attribute value for the third attribute and the fourth attribute, the second attribute value indicating a second level of similarity between the third attribute and the fourth attribute;
    modifying, by the processor, the second attribute value using the second attribute-type weight;
    calculating, by the processor, one or more sums for the first and second item pairing including the modified first attribute value and the modified second attribute value; and
    computing, by the processor, the match score for the first and second item pairing based on the one or more sums.

6. The computer-implemented method of claim 1, further comprising:
    determining a match-class descriptor for the first and second item pairing based on the match score including selecting the match-class descriptor from a plurality of match-class descriptors indicating levels of similarity between items, a plurality of match score buckets being defined by a plurality of match score thresholds, each of the plurality of match score buckets being associated with a match-class descriptor of the plurality of match-class descriptors.

7. The computer-implemented method of claim 6, further comprising:
    providing, by the processor, an administrative graphical user interface identifying the first and second item pairing and the match-class descriptor;
    receiving, by the processor, an input via the administrative graphical user interface modifying the match-class descriptor for the first and second item pairing;
    identifying, by the processor, the first and second item pairing as reviewed in a computer-accessible matching database;
    training, by the processor, a machine learning model based on the modified match-class descriptor for the first and second item pairing; and
    using, by the processor, the machine learning model to determine the first attribute-type weight.

8. The computer-implemented method of claim 7, wherein:
    training the machine learning model includes training a random forest multi-class classifier.

9. The computer-implemented method of claim 1, further comprising:
    determining, by the processor, an attribute-type indicator for a pairing of the first attribute with the second attribute based on the first item and the second item having a matching type for the first attribute type; and computing, by the processor, the match score for the first and second item pairing further based on the attribute-type indicator.

10. A system comprising:
one or more processors; and
a computer-readable memory storing instructions that, when executed by the one or more processors, cause the system to perform operations comprising:
determining a first attribute-type weight for a first attribute type, the first attribute-type weight indicating an impact of the first attribute type in determining similarity between items;
determining a first attribute of the first attribute type for a first item and a second attribute of the first attribute type for a second item, a first and second item pairing including the first item and the second item;
determining a first attribute value for the first attribute and the second attribute, the first attribute value indicating a first level of similarity between the first attribute and the second attribute;
modifying the first attribute value using the first attribute-type weight;
computing a match score for the first and second item pairing based on the modified first attribute value; and
in response to receiving a data query identifying the first item, providing a graphical user interface including a graphical element representing the second item based on the match score.

11. The system of claim 10, wherein determining the first attribute-type weight for the first attribute type includes:
receiving a training data set indicating combinations of items having the first attribute type;
receiving a plurality of match-class descriptors associated with match scores for the combinations of items; and
training the first attribute-type weight using the training data set and the plurality of match-class descriptors.

12. The system of claim 10, wherein the instructions further cause the system to perform operations comprising:
determining the first item and the second item from a category of items, the category being selected from a plurality of categories; and
determining the first attribute-type weight from a plurality of attribute-type weights based on the selected category of items.

13. The system of claim 12, wherein:
the plurality of attribute-type weights for the plurality of categories each describe a common attribute type.

14. The system of claim 10, wherein the instructions further cause the system to perform operations comprising:
determining a second attribute-type weight for a second attribute type, the second attribute-type weight indicating an impact of the second attribute type in determining similarity between the items;
determining a third attribute of the second attribute type for the first item and a fourth attribute of the second attribute type for the second item;
determining a second attribute value for the third attribute and the fourth attribute, the second attribute value indicating a second level of similarity between the third attribute and the fourth attribute;
modifying the second attribute value using the second attribute-type weight;
calculating one or more sums for the first and second item pairing including the modified first attribute value and the modified second attribute value; and computing the match score for the first and second item pairing based on the one or more sums.

15. The system of claim 10, wherein the instructions further cause the system to perform operations comprising:
determining a match-class descriptor for the first and second item pairing based on the match score including selecting the match-class descriptor from a plurality of match-class descriptors indicating levels of similarity between items, a plurality of match score buckets being defined by a plurality of match score thresholds, each of the plurality of match score buckets being associated with a match-class descriptor of the plurality of match-class descriptors.

16. The system of claim 15, wherein the instructions further cause the system to perform operations comprising:
providing an administrative graphical user interface identifying the first and second item pairing and the match-class descriptor;
receiving an input via the administrative graphical user interface modifying the match-class descriptor for the first and second item pairing;
identifying the first and second item pairing as reviewed in a computer-accessible matching database;
training a machine learning model based on the modified match-class descriptor for the first and second item pairing; and
using the machine learning model to determine the first attribute-type weight.

17. The system of claim 16, wherein:
training the machine learning model includes training a random forest multi-class classifier.

18. The system of claim 10, wherein the instructions further cause the system to perform operations comprising:
determining an attribute-type indicator for a pairing of the first attribute with the second attribute based on the first item and the second item having a matching type for the first attribute type; and
computing the match score for the first and second item pairing further based on the attribute-type indicator.

19. A computer-implemented method comprising:
determining, by a processor, a first attribute-type weight for a first attribute type, the first attribute-type weight indicating an impact of the first attribute type in determining similarity between items based on a machine learning model:
determining, by the processor, a first attribute of the first attribute type for a first item and a second attribute of the first attribute type for a second item, a first and second item pairing including the first item and the second item;
determining, by the processor, a first attribute value for the first attribute and the second attribute, the first attribute value indicating a first level of similarity between the first attribute and the second attribute;
modifying, by the processor, the first attribute value using the first attribute-type weight;
determining, by the processor, a second attribute-type weight for a second attribute type, the second attribute-type weight indicating an impact of the second attribute type in determining similarity between the items;
determining, by the processor, a third attribute of the second attribute type for the first item and a fourth attribute of the second attribute type for the second item;
determining, by the processor, a second attribute value for the third attribute and the fourth attribute, the second attribute value indicating a second level of similarity between the third attribute and the fourth attribute;

modifying, by the processor, the second attribute value using the second attribute-type weight;

calculating, by the processor, one or more sums for the first and second item pairing including the modified first attribute value and the modified second attribute value;

computing, by the processor, a match score for the first and second item pairing based on the one or more sums; and in response to receiving a data query identifying the first item, providing, by the processor, a graphical user interface including a graphical element representing the second item based on the match score.

20. The computer-implemented method of claim 19, further comprising:

determining, by the processor, a match-class descriptor associated with the match score for the first and second item pairing;

receiving, by the processor, an input via the graphical user interface modifying the match-class descriptor for the first and second item pairing; and training, by the processor, the machine learning model based on the modified match-class descriptor for the first and second item pairing.

\* \* \* \* \*